United States Patent
Wu et al.

(10) Patent No.: US 6,363,713 B1
(45) Date of Patent: Apr. 2, 2002

(54) ON-BOARD DIAGNOSTICS FOR DETECTING THE OPERATION OF DIESEL EMISSIONS CONTROL SYSTEM

(75) Inventors: Ching-Hsong George Wu, Farmington Hills; Christopher John Mazur, Canton, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/621,309

(22) Filed: Jul. 20, 2000

(51) Int. Cl.[7] ................................. F01N 3/00
(52) U.S. Cl. ............... 60/274; 60/277; 60/286; 60/276; 123/479; 123/690
(58) Field of Search ............ 60/274, 277, 276, 60/285, 286, 303, 289; 123/479, 690

(56) References Cited

U.S. PATENT DOCUMENTS

| | | |
|---|---|---|
| 5,201,802 A | 4/1993 | Hirota et al. |
| 5,419,122 A * | 5/1995 | Tabe et al. ............... 60/274 |
| 5,626,014 A | 5/1997 | Hepburn et al. |
| 5,649,420 A | 7/1997 | Mukaihira et al. |
| 5,706,652 A | 1/1998 | Sultan |
| 5,842,341 A * | 12/1998 | Kibe ............... 60/274 |
| 5,845,487 A | 12/1998 | Fraenkle et al. |
| 5,938,715 A | 8/1999 | Zhang et al. |
| 6,119,448 A * | 9/2000 | Emmerling et al. ....... 60/274 |
| 6,131,388 A * | 10/2000 | Sasaki et al. ............. 60/286 |

OTHER PUBLICATIONS

"A Simplified Approach to Modeling Exhaust System Emissions: SIMTWC", by Paul M. Laing et al, SAE Technical Paper No. 1999–01–3476, pp. 1–21.

* cited by examiner

Primary Examiner—Thomas Denion
Assistant Examiner—Binh Tran
(74) Attorney, Agent, or Firm—Carlos Hanze

(57) ABSTRACT

An on-board diagnostic method for detecting whether a diesel emissions control system is functioning properly by continuously monitoring the temperature rise generated by the catalyst and the light-off temperature with reference to theoretical values stored in an engine control computer. When either of the parameters falls below a predetermined threshold value, the vehicle emissions may exceed emission standards and, if so, the system causes a malfunction indicator light (MIL) to be energize to advise the driver of the need for service.

9 Claims, 3 Drawing Sheets

ON-BOARD DIAGNOSTICS FOR DETECTING THE OPERATION OF DIESEL EMISSIONS CONTROL SYSTEM

TECHNICAL FIELD

This invention relates to on-board diagnostics and, more particularly, to an on-board diagnostic method and system for diesel vehicles that determines the functionality of a catalyst as well as secondary fuel injection operation.

BACKGROUND ART

It is necessary to add reductant to a lean $NO_x$ catalyst under highly oxidized environment of diesel exhaust to reduce $NO_x$ emissions. When the reductant (typically diesel fuel) is injected into the exhaust gas, the burning of hydrocarbons across the catalyst releases heat, which increases the post-catalyst exhaust gas temperature. This resulting temperature rise and the characteristics of the temperature rises are related to the amount of fuel injection, the catalyst activity, exhaust flow, and other thermal properties of the catalyst system. For a given vehicle, the thermal properties of the exhaust system is assumed fixed. At the beginning, the catalyst and the secondary fuel injection system are assumed to be fresh and fully functional. Under these conditions, the degree of temperature rise, and the catalyst light-off temperature of HC are close to the theoretical values. As the vehicle mileage increases, the catalyst activity may degrade with time and the reductant delivery system may fail for some reasons. In order to ensure compliance of the emission standards, two key elements must be monitored continuously as required by OBDII. Analysis of the catalyst reveals that as catalyst ages, the light-off temperatures of $NO_x$, HC, and CO increase, and the $NO_x$ conversion efficiencies decrease. However, the peak conversion efficiencies for both HC and CO remain approximately the same as shown in FIGS. 1 and 2. For these reasons, the catalytic exotherm may remain the same, but the catalyst temperature to produce that exotherm increases. Thus, to evaluate the catalyst activity, the light-off temperature must be determined, in particular, the HC light-off temperature. To determine the HC light-off temperature, a series of exotherm vs. pre-catalyst temperatures (T) needs to be measured during fuel injection and temperature ramp-up excursion. The HC light-off temperature (LT) is defined as the temperature where temperature rise is equal to 50% of the predicted exotherm. Due to the heat transfer process and thermal properties of the catalyst system, there exists a delay time (dt=time to reach 95% of the expected temperature change) for the post-catalyst temperature (PT) to reach certain temperature after fuel injection. For a given catalyst system, the delay time is most sensitive to the exhaust flow rate and the temperature difference between the pre- and post-catalyst (PT–T). This delay time, dt, can be determined experimentally for each vehicle to fine-tune a simplified thermal model established. See, for example, "A Simplified Approach to Modeling Exhaust System Emissions: SIMTWC", P. M. Laing, M. D. Shane, S. Son, A. A. Adamczyk and P. Li, SAE, 1999-01-3476.

DISCLOSURE OF INVENTION

In accordance with the present invention, a diesel diagnostic method is proposed that detects the operation of secondary fuel injection and monitors catalyst activity by monitoring the magnitude of temperature rise and the HC light-off temperature of a catalyst system due to exotherm generated by the after treatment reductant injection.

More particularly, an on-board diagnostic method is proposed for detection of the functionality of the diesel emissions control system that permits a continuous operational check of the secondary fuel injection system and the catalyst activity. This is accomplished by monitoring the HC light-off temperature and the magnitude of temperature rise, MTR, due to the exotherm generated by the catalysts in an active lean $NO_x$ catalyst system. MTR generated by the catalysts is related to the amount of secondary fuel injection, exhaust flow rate, and catalytic conversion of HC. The light-off temperature, LT, is related to the activity of the catalyst. By continuously monitoring these two parameters with reference to theoretical values stored in an engine control computer on the vehicle, the operation of the secondary fuel injection system and catalyst activity can be evaluated. When either of the parameters falls below a predetermined threshold value, the vehicle emissions may exceed emission standards and, if so, the system causes a malfunction indicator light (MIL) to be energized to advise the driver of the need for service.

BEST MODE FOR CARRYING OUT THE INVENTION

Figure 1:
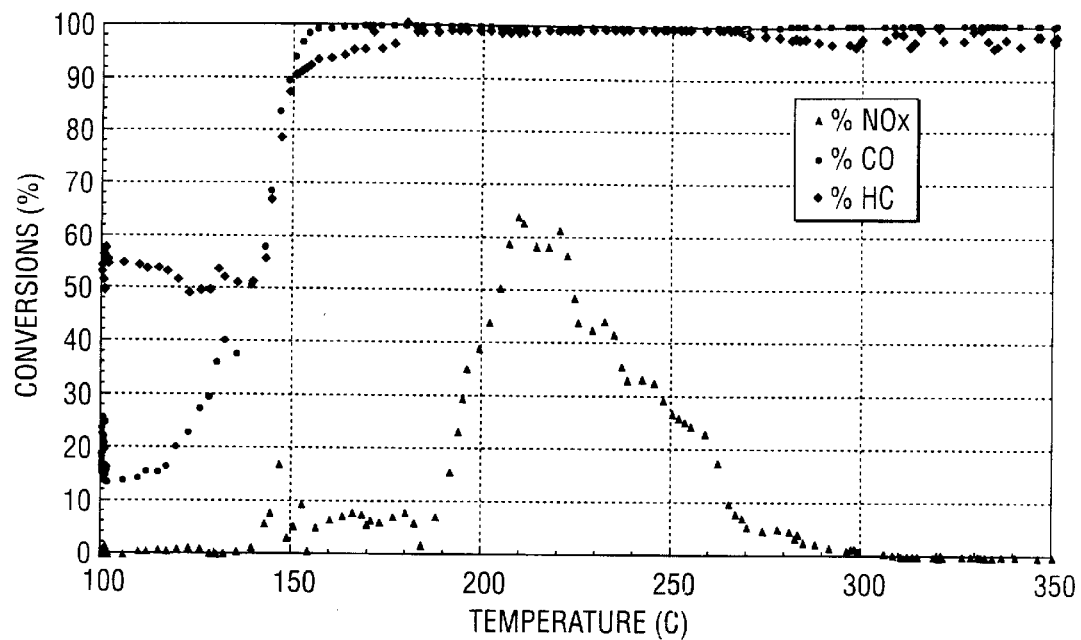
FIGS. 1 and 2 show typical performance for a fresh and aged catalyst, respectively.
Figure 2:
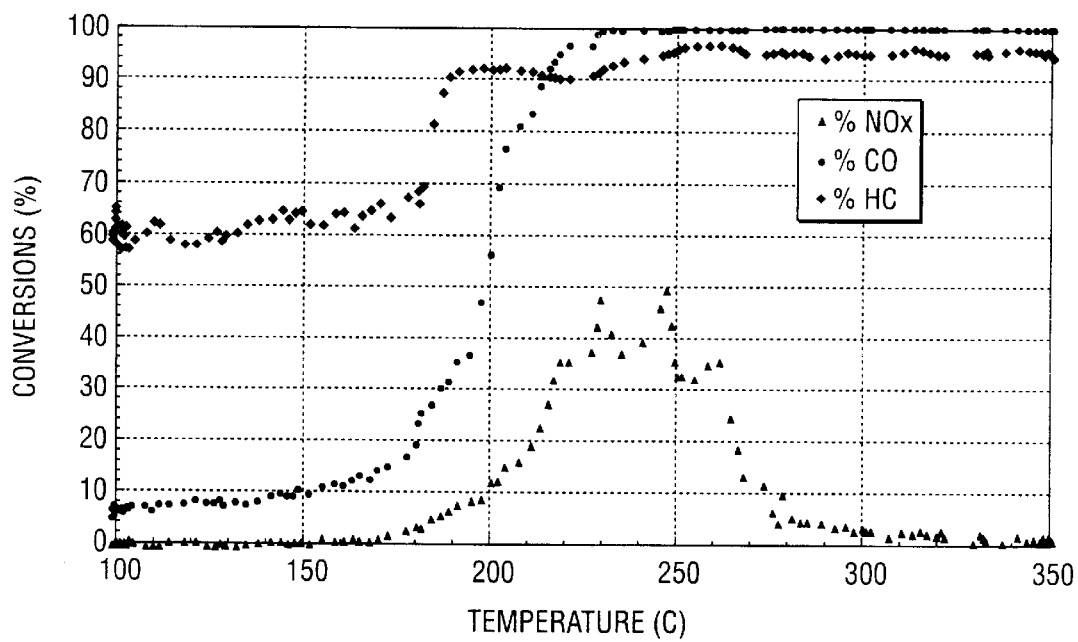
Figure 3:
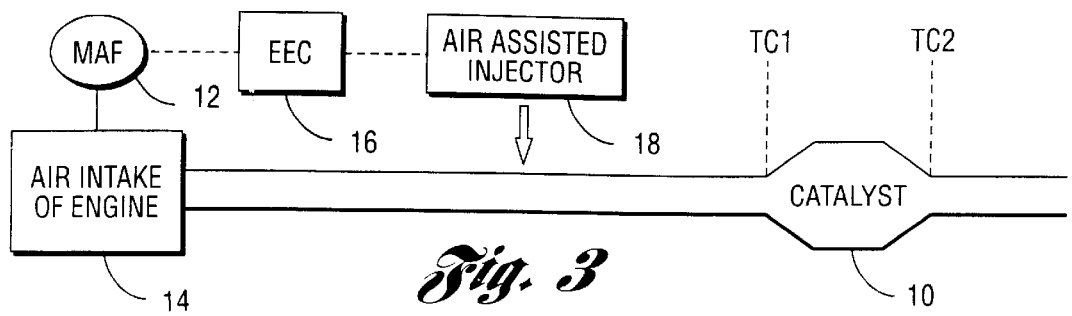
FIG. 3 is a schematic block diagram of the system of the present invention.

With reference to FIG. 3, a system for implementing the method of the present invention includes pre-catalyst and post-catalyst thermocouples TC1 and TC2, respectively, that are placed one-half inch from the face of the brick of catalyst 10. A MAF sensor 12 measures air flow into the engine 14, and the information from the sensor 12 is used by an electronic engine computer (EEC) 16 to calculate engine exhaust flow. This information plus engine speed and load are used by EEC to control an injector 18 for delivery of a desired amount of hydrocarbon into the catalyst 10. A malfunction indicator lamp (MIL) (not shown) is controlled by the computer 16.

Figure 4:
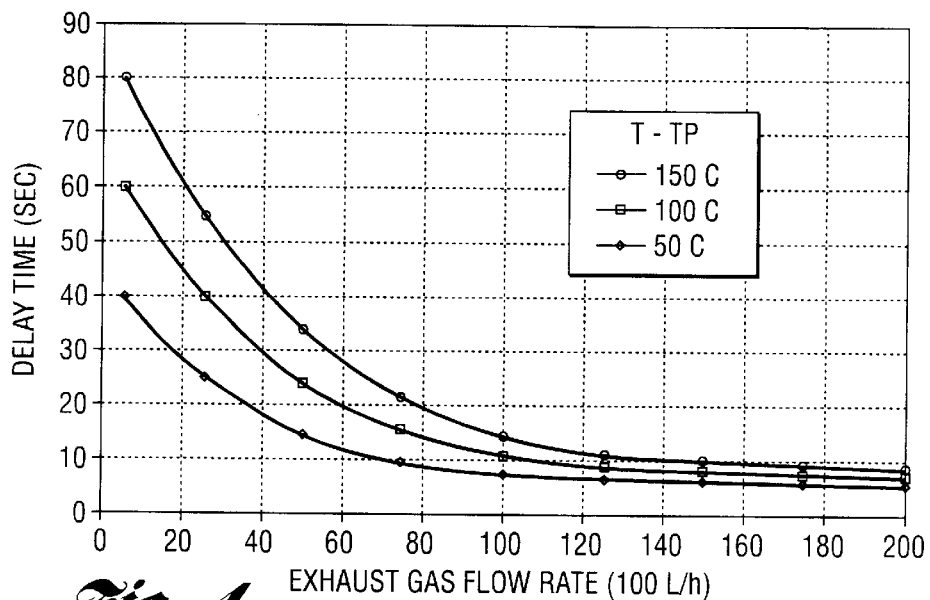
FIG. 4 is a plot of delay time vs. exhaust gas flow rate at three different temperature differences (T–PT)
Figure 5:
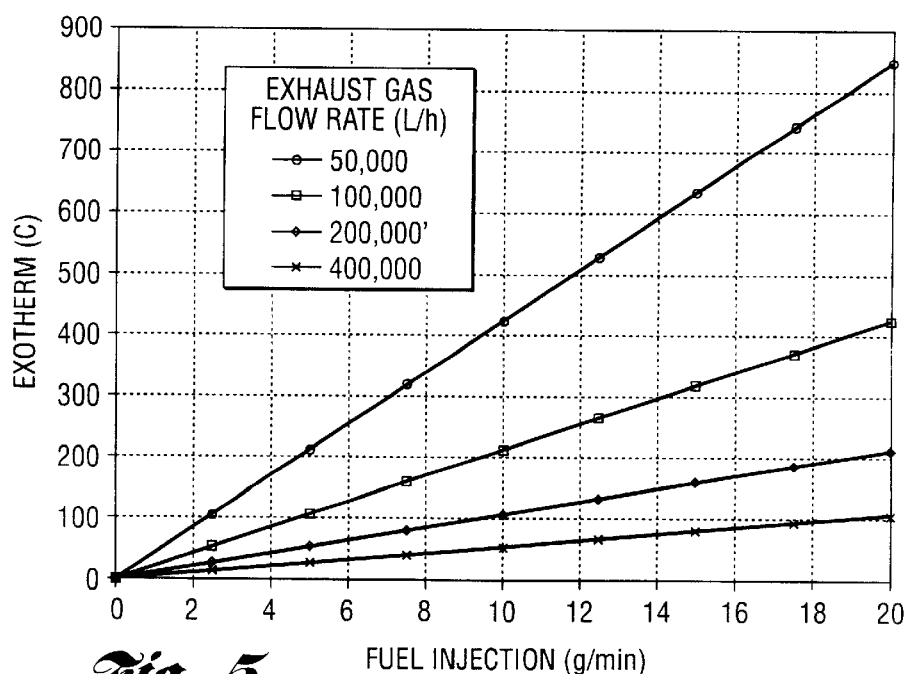
FIG. 5 show the theoretical exotherm vs. fuel injection at four different exhaust gas flow rates.

A lookup table of the delay times (dt) vs. small increments of flow rate is generated over the entire range of the driving cycle and stored in the EEC 16. A typical chart of the data in the lookup table is shown in FIG. 4. Another lookup table of theoretical temperature rises (TDT) vs. HC concentrations (which are functions of quantity of secondary fuel injection and exhaust flow rates) is stored in the EEC 16. A typical chart of this data is shown in FIG. 5. By measuring the magnitude of the temperature rise and the light-off temperature, the operation of the secondary fuel injection system can be determined.

Figure 6:
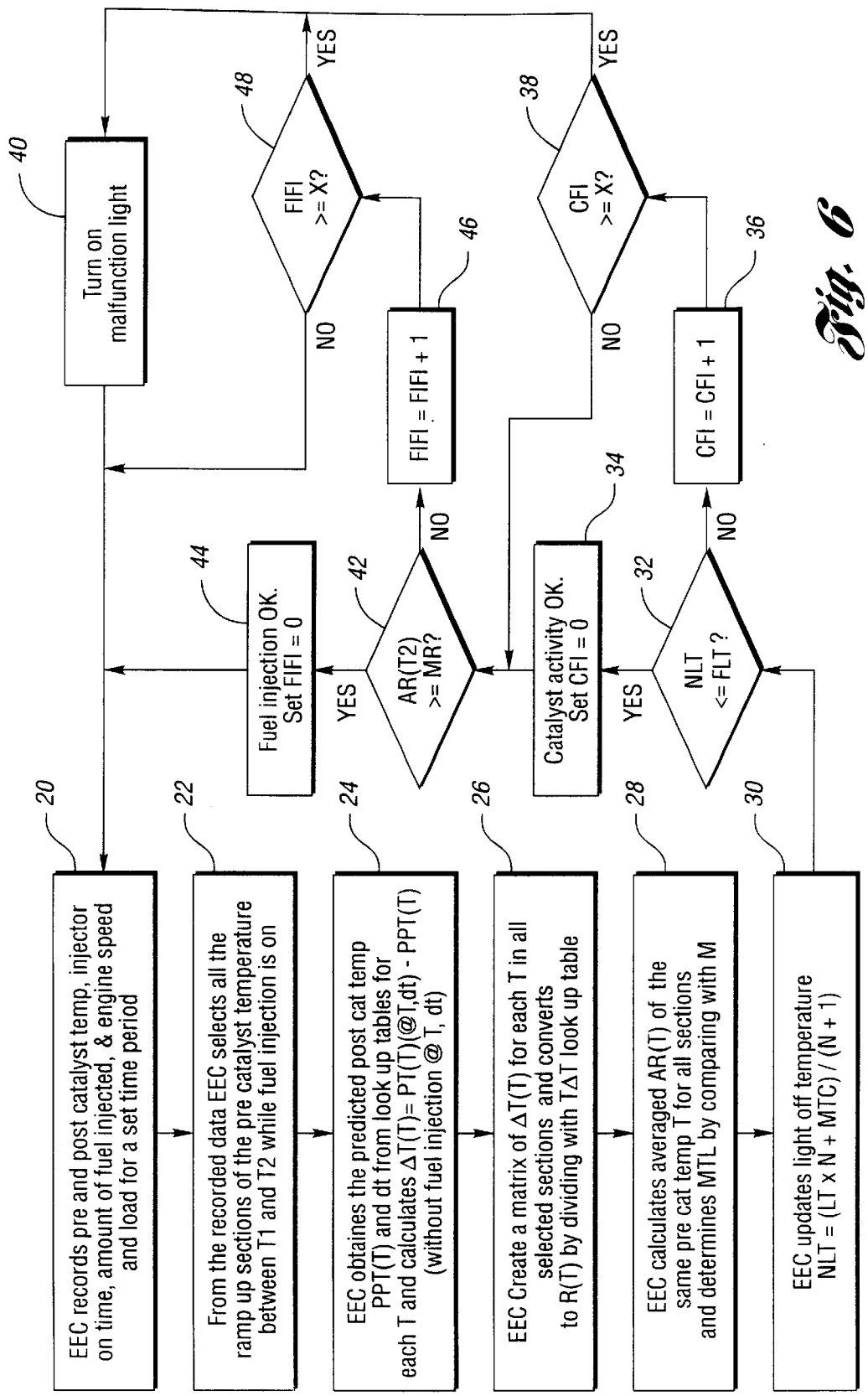
FIG. 6 is a flowchart of the method of the present invention.

Referring now to FIG. 6, a flowchart of the method of the present invention is shown. During vehicle operation, controlled amount of diesel fuel is routinely injected into the exhaust to enhance catalytic reduction of $NOX_x$. As indicated in block 20, the EEC determines the rate and the duration of HC injection in the specified temperature range and engine speed and load. This information plus the preand post-catalyst temperatures are recorded for a predetermined time period (e.g., 300 to 1200 sec) in the EEC for analysis. After the analysis, the data will be erased for the next batch recording and analysis.

As indicated in block 22, from the recorded temperature-time profiles, the program identifies all sections where both fuel injection occurs and the pre-catalyst temperatures show an overall increasing trend (ramp-up) anywhere between T1 and T2 with a minimal duration of 10 to 50 sec. T1 and T2 are the lower and upper limits of a temperature range, which encloses the HC light-off temperature (LT). The LT is equal to that of a fresh catalyst, initially, but is to be updated periodically due to catalyst aging. The range of (T2–T1) can be anywhere from 10° to 300° C., preferably from 20° to 120° C.

At blocks 24 and 26, ΔT(T) and R(T) are calculated. As indicated in block 24, once the sections are selected, the EEC begins to determine delay time, dt, and the predicted post-catalyst temperature PPT(T) for each T, assuming no fuel injection occurred, from the lookup tables. For the first data point in each section, this value is determined based on the post-catalyst temperature measured, PT. For the rest of data point, PPT(T)s are determined using the previous predicted post-catalyst temperatures. ΔT(T) is defined as the difference between the post-catalyst temperature measured, PT(T), and the predicted post-catalyst temperature PPT(T) at the pre-catalyst temperature T, and a delay time dt. It is calculated as follows:

$$\Delta T(T)=PT(T)(\text{measured @ } T, dt)-PPT(T)(\text{predicted without fuel injection @ } T, dt)$$

It is noted that ΔT(T) depends on the quantity of fuel injected and exhaust gas flow rate. For convenience of analysis, the ratio, R(T)=ΔT(T)/TΔT, is used, as indicated in block 26. This R(T) is a normalized quantity and is independent of the above mentioned variables.

At blocks 28 and 30, light-off temperature is determined. A matrix of R(T)s from T1 to T2 for all selected sections is generated. All R(T)s at the same T are averaged to obtain AR(T)s. The AR(T)s should show an increase trend from T1 to T2. The lowest T where AR(T) is equal or greater than a set value, M, is defined as MLT, which is the momentary light-off temperature, and M is a predefined number (e.g., 0.5 or from 0.3 to 0.8). At block 30, the new HC light-off temperature, NLT, is to be updated from the existing LT as follows:

$$NLT=(LT \times N+MLT)/(N+1)$$

where N is the number from 1 to over 10,000, depending on how heavily the existing LT is to be weighed. It is preferably 10 to 100. NLT will be the LT for the next batch analysis.

At blocks 32–40, catalyst activity is checked to determine whether the catalyst is performing properly or is malfunctioning. At block 32, a check is made to determine if NLT≦FLT, where FLT is the HC light-off temperature of a fully deactivated catalyst that fails to meet the regulatory emissions standards. If so, the catalyst activity is good and the catalyst fault index is reset to CFI=0, as indicated in block 34, and the process continues. Otherwise, CFI is incremented by 1 as indicated in block 36. If CFI≧X, as determined in block 38, where X can be 5 to 50, the malfunction light is energized at block 40, and the process continues.

If CFI is not ≧X, as determined in block 38, at blocks 42–48 the fuel injection system is checked to determine whether the injection system is functioning properly. At block 42, a determination is made whether AR(T2) ≧MR, where MR is the number from 0.5 to 1.0, preferably 0.75 to 1.0. If so, the exotherm is close to the theoretical value indicating the proper function of the injection system as indicated in block 44 and the fuel injection fault index is reset to FIFI=0 and the process continues. Otherwise, FIFI is incremented at block 46. If FIFI≧X, as determined in block 48, the malfunction light is energized at block 40 and the process continues. Otherwise, the process continues without energizing the lamp. Glossary of Terms Used

| | |
|---|---|
| AR(T) | Average of R(T) @ T |
| CFI | Catalyst fault index |
| dt | The delay time to reach 95% of the predicted exotherm |
| FLT | HC light-off temperature for a fully aged catalyst that just fails to meet the emission standards |
| FIFI | Fuel injection fault index |
| LT | HC light-off temperature |
| MLT | Momentary light-off temperature |
| NLT | New HC light-off temperature |
| PT | Post-catalyst temperature measured |
| PT(T) | Post-catalyst temperature measured @ T, dt |
| PPT(T) | Predicted post-catalyst temperature assuming no fuel injection occurred @ T, dt |
| R(T) | Ratio of ΔT(T)/TΔT |
| T | Pre-catalyst temperature measured |
| T1 | Lower limit of the temperature range enclosing LT |
| T2 | Upper limit of the temperature range enclosing LT |
| TΔT | Exotherm or theoretical temperature rise |
| ΔT(T | The difference between the measured post-catalyst temperature, PT(T), and predicted post-catalyst temperature, PPT (T), at T, and a delay time, dt, assuming no fuel injection. |

While the best mode for carrying out the invention has been described in detail, those familiar with the art to which this invention relates will recognize various alternative designs and embodiments for practicing the invention as defined by the following claims.

What is claimed is:

1. An on-board diagnostic method for a diesel emission control system including a catalyst and a fuel injection system for periodically injecting controlled amounts of diesel fuel into the exhaust stream of the diesel engine to enhance catalytic reduction of $NO_x$, comprising a sequence of the following steps:

determining a catalyst light off temperature;
   energizing an indicator to indicate a malfunction of said fuel injection system if the catalyst light off temperature is less than the light off temperature for a fully aged catalyst that just fails to meet the emission standards (FLT) and AR(T2) is than MR where, MR is a number between 0.5 and 1,
   AR(T2) is the average of R(T) @ T,
   R(T) is the ratio of ΔT(T)/TΔT,
   ΔT(T) is the difference between the measured post catalyst temperature, PT(T), and predicted post catalyst temperature, PPT (T), at T, and a delay time, dt, assuming no fuel injection, and
   TΔT is the exotherm or theoretical temperature rise.

2. An on-board diagnostic method for a diesel emission control system including a catalyst and a fuel injection system for periodically injecting controlled amounts of diesel fuel into the exhaust stream of the diesel engine to enhance catalytic reduction of $NO_x$, comprising a sequence of the following steps:

determining a catalyst light off temperature;

energizing an indicator to indicate a malfunction of said catalyst if the catalyst light off temperature is not less than the light off temperature for a fully aged catalyst that just fails to meet the emission standards (FLT); or to indicate a malfunction of said fuel injection system if the catalyst light off temperature is less than FLT and AR(T2) is less than MR where, MR is a number between 0.5 and 1, AR(T2) is the average of R(T) @ T, R(T) is the ratio of $\Delta T(T)$ T$\Delta$T, $\Delta T(T)$ is the difference between the measured post catalyst temperature, PT(T), and predicted post catalyst temperature, PPT (T), at T, and a delay time, dt, assuming no fuel injection, and T$\Delta$T is the exotherm or theoretical temperature rise.

3. An on-board diagnostic method for a diesel emission control system where controlled amounts of diesel fuel are periodically injected into an exhaust stream of the diesel engine as a function of engine speed and load to enhance catalytic reduction of $No_x$, comprising a sequence of the following steps:

storing pre- and post-catalyst temperature, injector on time, amount of fuel injected, and engine speed and load for a predetermined time period;

selecting, from the stored data, all the ramp-up sections of the pre-catalyst temperature T between T1 and T2 while fuel is being injected;

determining from lookup tables the predicted post-catalyst temperature, PPT(T) and dt for each T and calculating $\Delta T(T)$=PT(T) (@ T,dt)−PPT(T) (without fuel injection @ T, dt) where dt is the delay time to reach a predetermined percentage of the predicted temperature change;

creating a matrix of $\Delta T(T)$ for each T in all selected ramp-up sections;

converting $\Delta T(T)$ to R(T) by dividing $\Delta T(T)$ by T$\Delta$T obtained from a lookup table;

calculating a value AR(T) which is an average R(T) of the same pre-catalyst temp T for all selected ramp-up sections;

determining a momentary light-off temperature MLT;

determining new light-off temperature NLT where NLT= (LT×N+MLT)/(N+1);

determining whether the new light-off temperature NLT is $\leq$FLT, where FLT is the HC light-off temperature of an fully deactivated catalyst that fails to meet the regulatory emissions standards;

incrementing a catalyst fault index (CFI) if NLT is not $\leq$FLT; and energizing an indicator when the CFI exceed a predetermined number.

4. The invention defined by claim 3 where light-off temperature is determined by generating a matrix of R(T)s from T1 to T2 for all selected sections and averaging all R(T)s at the same T to obtain AR(T)s and updating a new HC light-off temperature, NLT, from the existing LT as follows:

$$NLT=(LT\times N+MLT)/(N+1),$$

where N is a number dependent on how heavily the existing LT is to be weighed, MLT is the momentary light-off temperature and is defined as the lowest T where AR(T) is equal to or greater than a predetermined set value, M.

5. The invention defined by claim 4 including the further steps of:

if CFI is not $\geq$X determining whether AR(T2)$\geq$MR, where MR is the number from 0.5 to 1.0;

if AR(T2) is not $\geq$MR, then incrementing a fuel injection fault index (FIFI) and if FIFI is greater than X then energizing said indicator to indicate that the fuel injection system is not functioning properly.

6. The invention defined in claim 5 where said predetermined percentage is 95%, and M is equal to 0.3 to 0.8.

7. An on-board diagnostic method for a diesel emission control system where controlled amounts of diesel fuel are periodically injected into an exhaust stream of the diesel engine as a function of engine speed and load to enhance catalytic reduction of $NO_x$, comprising a sequence of the following steps:

determining the rate and the duration of HC injection over a predetermined temperature range;

measuring the pre-catalyst temperature T and the associated post-catalyst temperature PT for a predetermined time period dt over a predetermined pre-catalyst temperature range T1–T2 where T1 and T2 are the lower and upper limits of a temperatures range which encloses an HC light-off temperature (LT) that is a function of catalyst age;

identifying, within the data obtained in the foregoing determining and measuring steps, where both fuel injection occurs and the pre-catalyst temperatures show an overall increase between T1 and T2 with a minimal predetermined duration;

determining a predicted post-catalyst temperature PPT(T) for each T, assuming no fuel injection occurred;

calculating a value $\Delta T(T)$=PT(T) (measured @ T, dt)− PPT(T) (predicted without fuel injection @ T,dt)

calculating a normalized quantity, R(T)=$\Delta T(T)$/T$\Delta$T;

determining a new light-off temperature NLT;

determining whether NLT$\leq$FLT, where FLT is the HC light-off temperature of an fully deactivated catalyst that fails to meet the regulatory emissions standards;

incrementing a catalyst fault index (CFI) and repeating the above steps if NLT is not $\leq$FLT; and energizing an indicator when the CFI exceed a predetermined number.

8. The invention defined by claim 7 where light-off temperature is determined by generating a matrix of R(T)s from T1 to T2 for all selected sections and averaging all R(T)s at the same T to obtain AR(T)s and updating a new HC light-off temperature, NLT, from the existing LT as follows:

$$NLT=(LT\times N+MLT)/(N+1),$$

where N is a number dependent on how heavily the existing LT is to be weighed, MLT is the momentary light-off temperature and is defined as the lowest T where AR(T) is equal to or greater than a predetermined set value, M.

9. The invention defined by claim 8 including the further steps of:

if CFI is not $\geq$X determining whether AR(T2)$\geq$MR, where MR is the number from 0.5 to 1.0;

if AR(T2) is not $\geq$MR, then incrementing a fuel injection fault index (FIFI) and if FIFI is greater than X then energizing said indicator to indicate that the fuel injection system is not functioning properly.

* * * * *

UNITED STATES PATENT AND TRADEMARK OFFICE
CERTIFICATE OF CORRECTION

PATENT NO. : 6,363,713 B1
DATED : April 2, 2002
INVENTOR(S) : Wu et al.

It is certified that error appears in the above-identified patent and that said Letters Patent is hereby corrected as shown below:

Title page,
Item [*] Notice, delete the phrase "by 0 days" and insert -- by 20 days --

Signed and Sealed this

Twenty-eighth Day of September, 2004

JON W. DUDAS
*Director of the United States Patent and Trademark Office*